United States Patent [19]

Le Devehat

[11] Patent Number: 5,294,154

[45] Date of Patent: Mar. 15, 1994

[54] TEMPORARY SELECTIVE PIPE CONNECTION APPARATUS WITH MULTIPLE INLETS AND OUTLETS

[75] Inventor: Eugene Le Devehat, Saligny, France

[73] Assignee: FMC Corporation, Chicago, Ill.

[21] Appl. No.: 915,212

[22] Filed: Jul. 20, 1992

[30] Foreign Application Priority Data

Aug. 21, 1991 [FR] France ................ 91 10492

[51] Int. Cl.$^5$ ............................................. F16L 35/00
[52] U.S. Cl. ................................. 285/26; 285/31;
  285/179; 285/302; 285/317; 285/320; 285/310;
  285/920
[58] Field of Search ............. 285/24, 25, 26, 27,
  285/28, 29, 315, 320, 326, 364, 93, 61, 920, 912,
  181, 163, 164, 165, 166, 167, 168, 317, 18, 31,
  302, 310

[56] References Cited

U.S. PATENT DOCUMENTS

| | | | |
|---|---|---|---|
| 3,664,386 | 5/1972 | Wenzel | 285/185 X |
| 3,744,376 | 7/1973 | Carpenter | 91/414 |
| 3,826,539 | 7/1974 | Kunz et al. | 285/21 X |
| 4,017,662 | 4/1989 | Skibowski | 137/312 |
| 4,176,864 | 12/1979 | Pohl et al. | 285/181 |
| 4,188,050 | 2/1980 | Lochte | 285/920 X |
| 4,207,920 | 6/1980 | Westerhoff | 285/168 X |
| 4,634,150 | 1/1987 | Forster | 285/24 |
| 4,658,874 | 4/1987 | Meyerinck | 285/168 X |
| 4,790,568 | 12/1988 | Skibowski | 285/28 |
| 4,915,147 | 4/1990 | Skibowski | 141/181 |
| 5,160,173 | 11/1992 | Devehat | 285/26 |

FOREIGN PATENT DOCUMENTS

| | | | |
|---|---|---|---|
| 2426151 | 12/1975 | Fed. Rep. of Germany | 285/168 |
| 2643265 | 3/1978 | Fed. Rep. of Germany | 285/181 |
| 2731434 | 1/1979 | Fed. Rep. of Germany | 285/168 |
| 1566599 | 5/1980 | United Kingdom | 285/28 |

*Primary Examiner*—Dave W. Arola
*Attorney, Agent, or Firm*—Lawrence Cruz; Richard B. Megley

[57] ABSTRACT

A fluid handling installation for selectively connecting any one of a plurality of inlet conduits to any one of a plurality of outlet conduits includes a frame supported manifold configuration of a plurality of perpendicular conduits and corresponding connection modules that can be selectively operated to connect inlet and outlet conduits.

18 Claims, 5 Drawing Sheets

TEMPORARY SELECTIVE PIPE CONNECTION APPARATUS WITH MULTIPLE INLETS AND OUTLETS

BACKGROUND OF THE INVENTION

This invention concerns pipe connection apparatus, and more specifically multiple pipe installations for selectively connecting any one of a plurality of inlet pipes to any one of a plurality of outlet pipes. The embodiment described herein is directed to pipes for circulation of petroleum products.

A routine requirement in multiline fluid distribution installations is to be able to connect any one of several inlet lines to any one of several outlet lines.

To this end consideration has already been given to disposing the inlet lines and the outlet lines in parallel planes and two perpendicular directions in these planes, and to providing the end of each line with a telescopic end-piece adapted to extend parallel to these planes until it comes into contact with the telescopic end-piece of any one line of the other category. This has various drawbacks, however.

First the use of telescopic end-pieces raises sealing, guidance and mechanical strength problems which, in practice, limit the application of this solution to small numbers of inlet and outlet lines. Less importantly, this solution does not lend itself well to automation. Furthermore, and more importantly, the use of telescopic sections necessarily involves a variation in the inside diameter which significantly reduces the effectiveness of a pipeline pig or scraper designed to cleanse the walls of inlet and outlet lines.

Another requirement in multiline fluid distribution installations has been for a "liquid switching station" formed of pipes all of which can be scraped clean.

SUMMARY OF THE INVENTION

An object of the present is to significantly reduce the overall dimensions of a multiple inlet/output pipe connection installation while retaining the advantages of automatic operation and constant diameter to enable cleaning by scraping. Another object of the invention is to minimize the number of pipe elbows that the installation utilizes between the fluid inlet and outlet lines, thereby avoiding a large a number of changes of direction that the scraper must negotiate as it passes through the installation.

To this end the invention comprises a temporary selective pipe connection installation with multiple fluid inlets and outlets, including a generally parallelogram-shaped frame. The installation include a first series of n coplanar equidistant parallel pipelines extending between first and third parallel sides of the frame and a second series of m coplanar equidistant parallel pipelines extending between second and fourth parallel sides of the frame. The first and second series of pipelines have the same inside diameter and are situated in parallel planes offset by a given distance. The pipelines of the first series extend in a direction perpendicular to the direction in which the pipelines of the second series extend. Each pipeline comprises a string of identical modular sections of which there are at least m−1 for the lines of the first series and at least n−1 for the lines of the second series. Each string is connected at one end to a fixed tubular end section adapted to be connected to a fluid inlet or outlet, and at the other end to a blind end section fixed to a translation control unit. The fixed end sections of the pipelines of the first and second series are, respectively, fixed to the first and second sides, and the translation control units of the pipelines of the first and second series are, respectively, fixed to the third and fourth sides. The modular sections are releasably connected together and to the end sections by coupling means having a release position whereby the connection between any two sections may be temporarily broken.

The modular sections of the pipelines of each series have a length equal to the distance between the pipelines of the other series, and sealing members are provided at each interface between the modular and/or end sections. The modular sections and the blind end section of each pipeline are individually slidably mounted on guide rails parallel to said pipeline whereby, when the connection between any two sections of a pipeline is temporarily broken, translatory movement of the blend end section of the pipeline by its translation control unit away from the fixed end section of said pipeline produces a gap in said pipeline between said sections.

The apparatus further includes a free connecting member for connecting a pipeline from the first series with a pipeline from the second series which is adapted to occupy two such gaps, one in each of the two pipelines belonging to a respective one of the series. The free connecting member comprises a central section adapted to be aligned approximately parallel with a third direction perpendicular to both the first and the second directions. The connecting member further comprises two transverse sections perpendicular to the central section, with each of the two transverse sections aligned, respectively with the first and second directions central section includes two tubular pipe elbows of the same inside diameter as the pipelines. The transverse sections are adapted for temporary connection to the pipelines by translatory movement of the blind end sections of the pipelines towards the fixed end sections thereof.

It also should be understood that an installation of this kind lends itself to future modification provided that the frame is modifiable (modular),for it then is a simple matter to add a pipeline into one series and a modular section into each of the pipelines of the other series.

Objects, characteristics and advantages of the invention will emerge from the following description given by way of non-limiting illustrative example with reference to the appended drawings

DESCRIPTION OF THE PREFERRED EMBODIMENT

FIGS. 1-6 illustrate a multiple temporary selective connection apparatus in accordance with the present invention, adapted to connect any one of several inlet lines E1, ---, E7 to any one of several outlet lines S1, --- S4 and to avoid any possibility of mutual "pollution" of the products carried by the various lines connected by the installation, in particular in the event of accidental leaks. The apparatus enables simultaneous use of all the lines connected if there are the same number of inlet and outlet lines; it goes without saying that when, as here, the number n (in this example n=7) of inlet lines is different than the number m (in this example m=4) outlet lines, the maximum number of lines that can be connected simultaneously is equal to the smaller of the numbers n and m.

Figure 1:
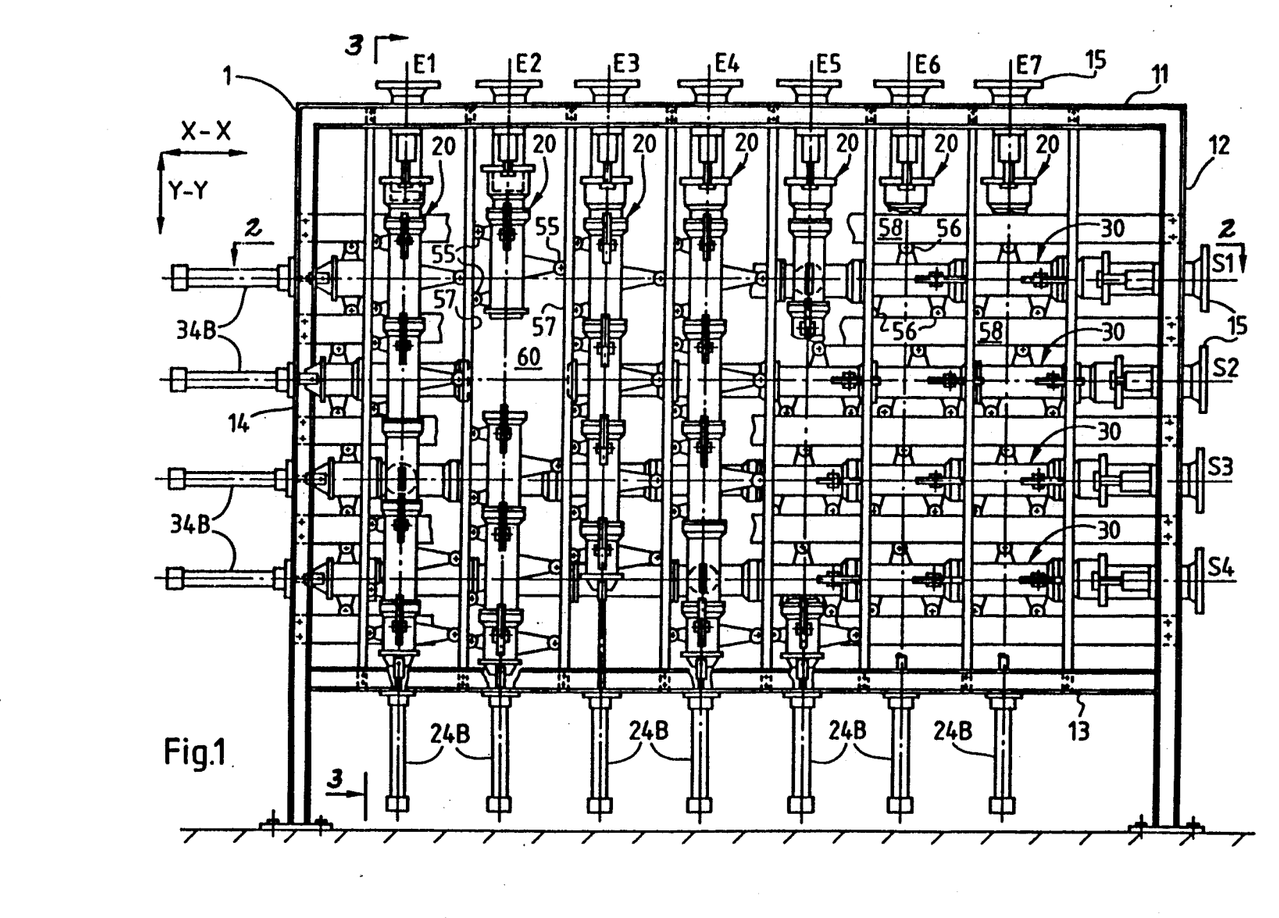
FIG. 1 is a view in elevation, with some parts cut away, of a pipe connection apparatus in accordance with the present invention having seven fluid inlets and four finds outlets, and shown without its manipulator.

The apparatus comprises an upstanding frame 1 provided, in this embodiment, with feet and disposed vertically to form a gantry. The frame is generally parallelogram-shaped (rectangular in this instance) with a top side 11 with fluid inlets E1–E7, a righthand vertical side 12 with fluid outlets S1–S4, a bottom side 13 and a lefthand vertical side 14. The inlets E1–E7 and outlets S1–S4 are provided with coupling flanges 15.

Figure 2:
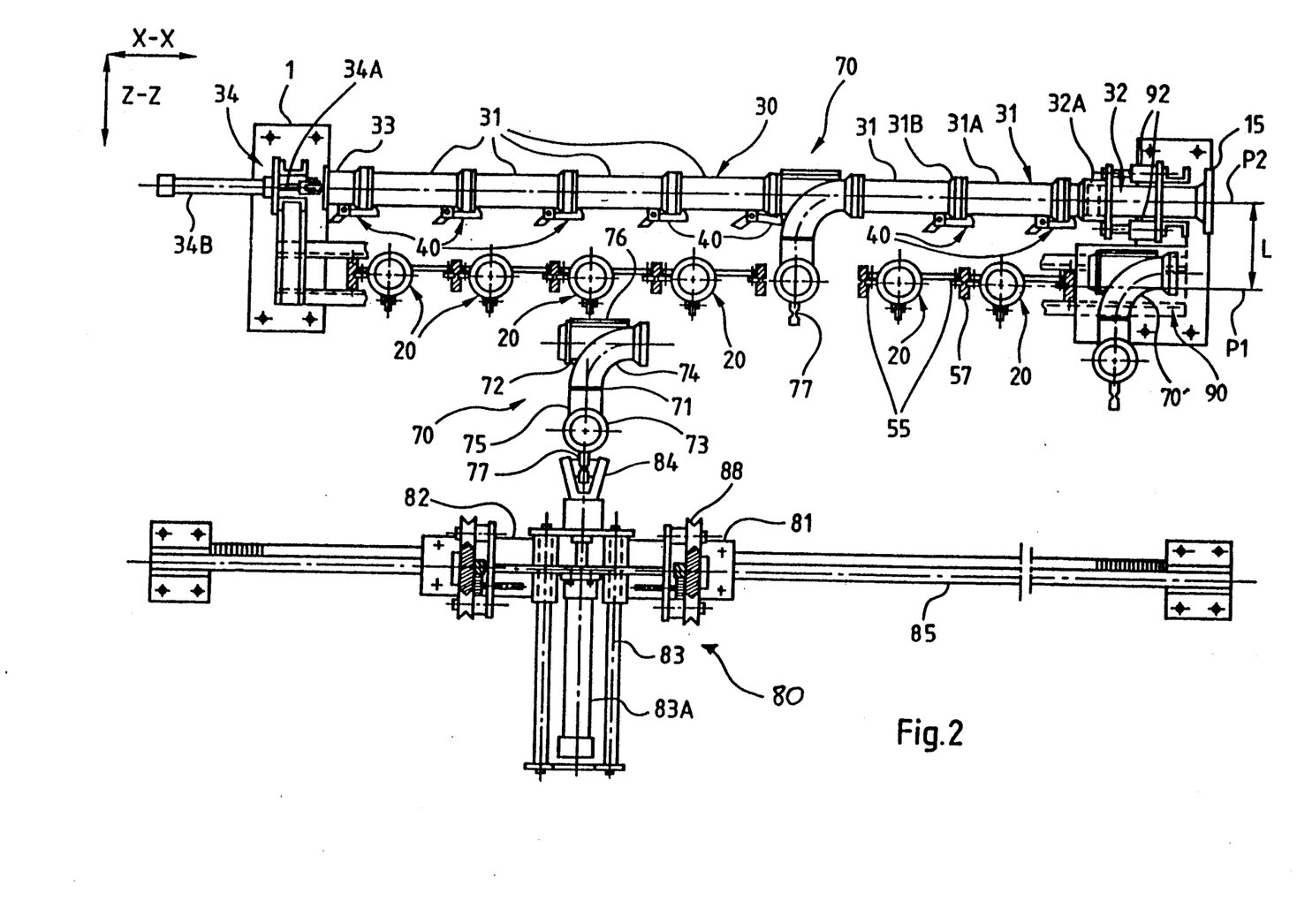
FIG. 2 is a plan view on the line 2—2 of FIG. 1.
Figure 3:
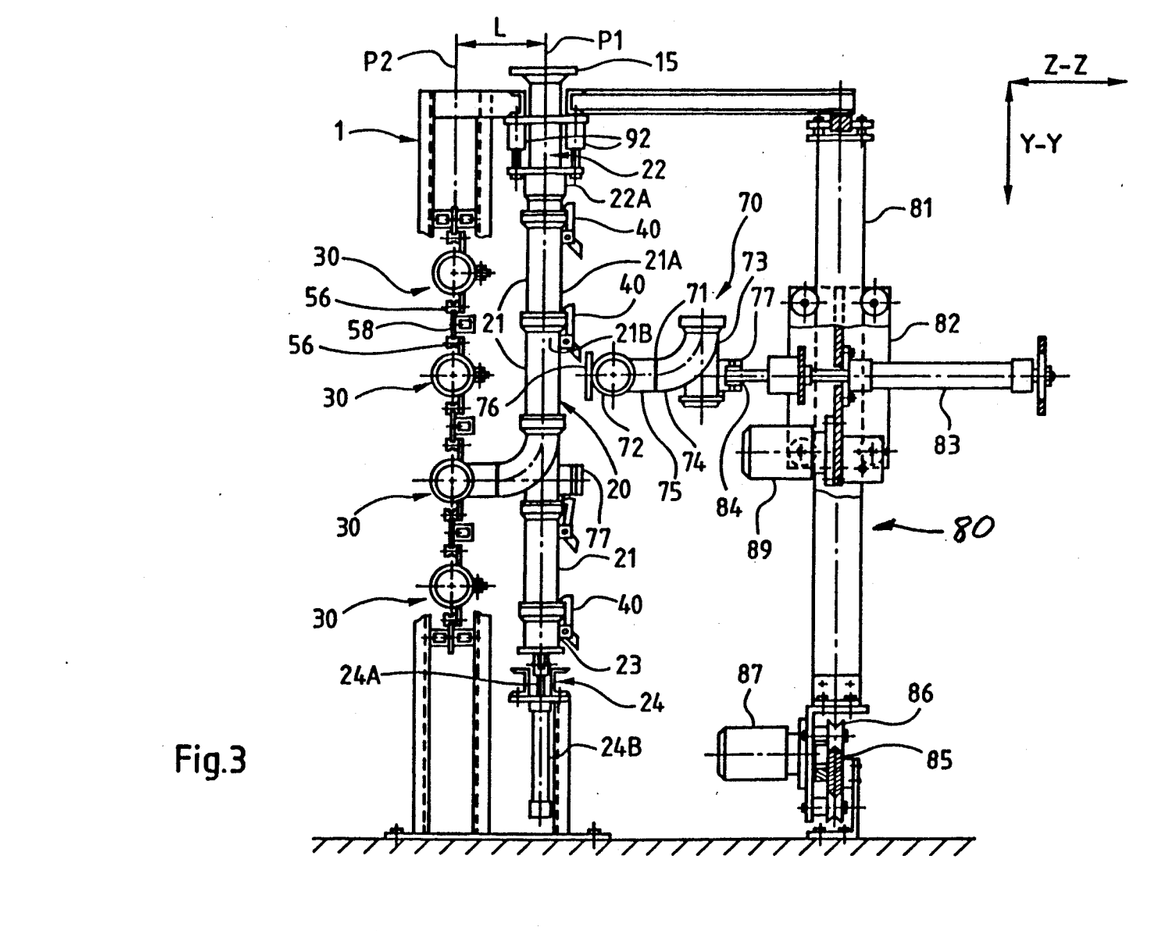
FIG. 3 is a view in elevation on the line 3—3 of FIG. 1.
Figure 5:
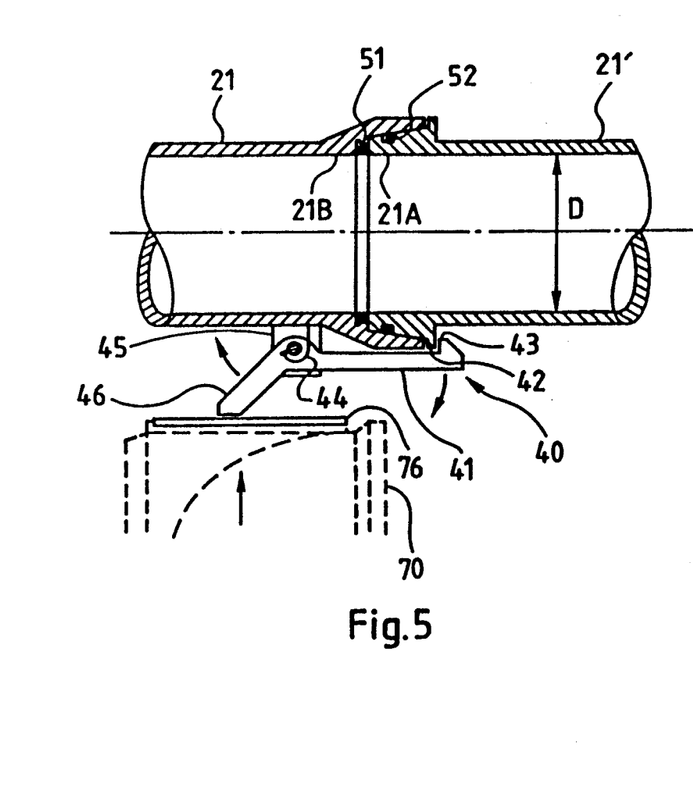
FIG. 5 is an enlarged fragmentary view showing the interface between two pipeline sections coupled together but on the point of being released.
Figure 6:
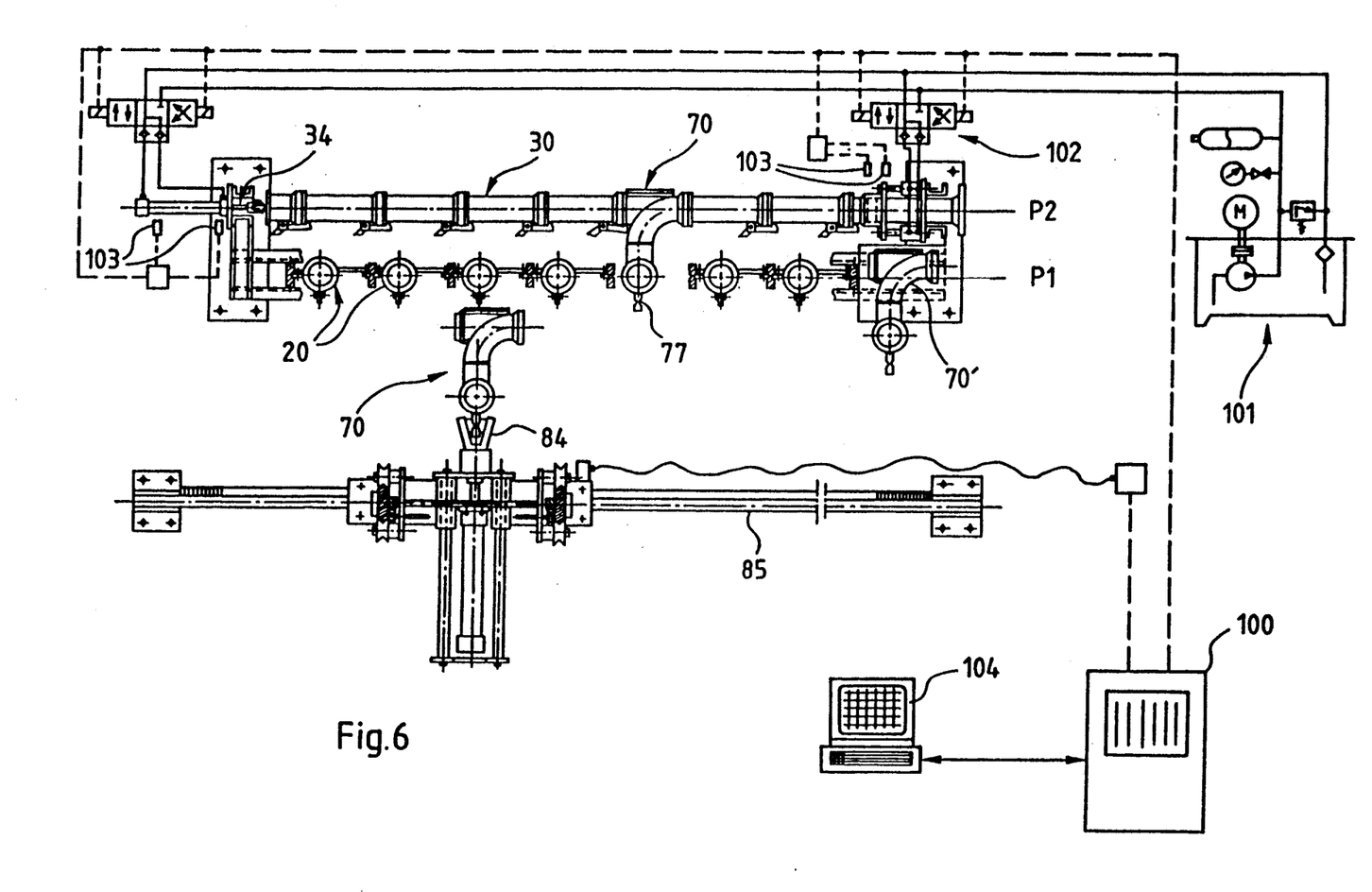
FIG. 6 is a view like FIG. 2, but in reduced scale and including a block diagram of the detection, control and supply circuits of the apparatus.

A first direction X—X is defined as the horizontal direction of the top side 11 and bottom side 13. A second direction Y—Y is defined as the vertical direction of the righthand and lefthand sides 12 and 14. Within the frame 1 are disposed a first series of seven vertical tubular lines 20 (equal in number to the fluid inlets) which are parallel, equidistant and coplanar, and which extend fluid inlets) which are parallel, equidistant and coplanar, and which extend parallel to the direction Y—Y, and a second series of four horizontal tubular lines 30 (equal in number to the fluid outlets) which are parallel, equidistant and coplanar, and which extend parallel to the direction X—X. The lines 20 and 30 have the same inside diameter D (FIG. 5). The axes of the lines 20, 30 are disposed in two planes P1 and P2 (FIG. 2) offset by a predetermined distance L in a third direction Z—Z which, in this embodiment, is perpendicular to the directions X—X and Y—Y (FIGS. 2 and 3).

Each tubular line 20 comprises a string of three identical modular tubular sections 21, and each line 30 comprises a string of four identical modular sections 31. Thus the number of sections in one series is one less than the number of lines in the other series. Each section 21 faces a line 30 of the other series, and in like manner each section 31 faces a line 20. The length of the sections 21, 31 is equal to the distance between the lines in the other series. Each string 20, 30 is connected at one end to a fixed tubular end section 22, 32, respectively, which end section terminates in one of the connecting flanges 15. At the other end each string 20, 30 is connected to a blend end section 23, 33, respectively, that is fixed to a translation control unit 24, 34. To be more precise, each blind end section 23, 33 is fixed at the piston rod 24A, 34A of a piston-and-cylinder actuator whose cylinder 24B, 34B is fixed to the bottom side 13 or the lefthand side 14, respectively.

The modular and end tubular sections 21, 22, 23, and 31, 32, 33, are connected together by couplings 40 having a release position whereby the connection between the modular or end sections of a line can be broken temporarily between any two of these sections. To be more precise (FIG. 5), the coupling at the interface between any two sections, such as 21 and 21', comprises a pivoting hook 41 carried by one of the sections and a rim 42 on the other section, which rim is adapted to engaged and retained axially by the nose 43 of the hook. The hook 41 is held in the locked position by a spring return member 44, and is pivotally mounted in a yoke 45 of which only a portion is shown in FIG. 5 in order to more clearly show the mounting of the hook. The hook 41 is fastened to an operating lever 46 which can be depressed to move the hook into its release position.

Each modular section 21, 31, comprises a male end-piece 21A, 31A and a female end-piece 21B, 31B, respectively, and each end section comprises a male or female end-piece complementary to the end-piece facing it. Seals 51 and 52 (FIG. 5) on all the male and female end-pieces guarantee a pressure-tight seal at the large number of interfaces between sections. The modular sections 21, 31 and the blind end section 23, 33 of each line are individually supported by rollers 55, 56 on guide rails 57, 58 parallel to each line. Thus, when the connection between any two sections of a line is temporarily broken, translatory movement of the blind end section 23, 33 of the line by the associated translation control unit 24, 34 towards the bottom side 13 or lefthand side, 14, respectively, opens a gap 60 in the line (FIG. 1).

Two lines of the series are connected by a free connecting member 70 (FIG. 2) which has a generally twisted "S38 shape. To be more precise, the member 70 comprises a central section 71 which is at least approximately parallel to Z—Z, and two transverse sections 72 and 73 offset lengthwise of the central section by a distance equal to the distance L between the two planes P1 and P2 and designed by align with X—X and Y—Y, respectively. The central section 71 includes two tubular pipe elbows 74 and 75 with the same inside diameter as the lines 20, 30 and adapted to be connected simultaneously to fixed end sections 22, 32 of said lines. The member 70 is provided at the opposite ends of its double elbow section 71 with male and female end-pieces. No mechanical coupling is required for positioning and sealing the lines to the connecting member 70; all that is required is to deploy the actuators 24 and 34.

Figure 4:
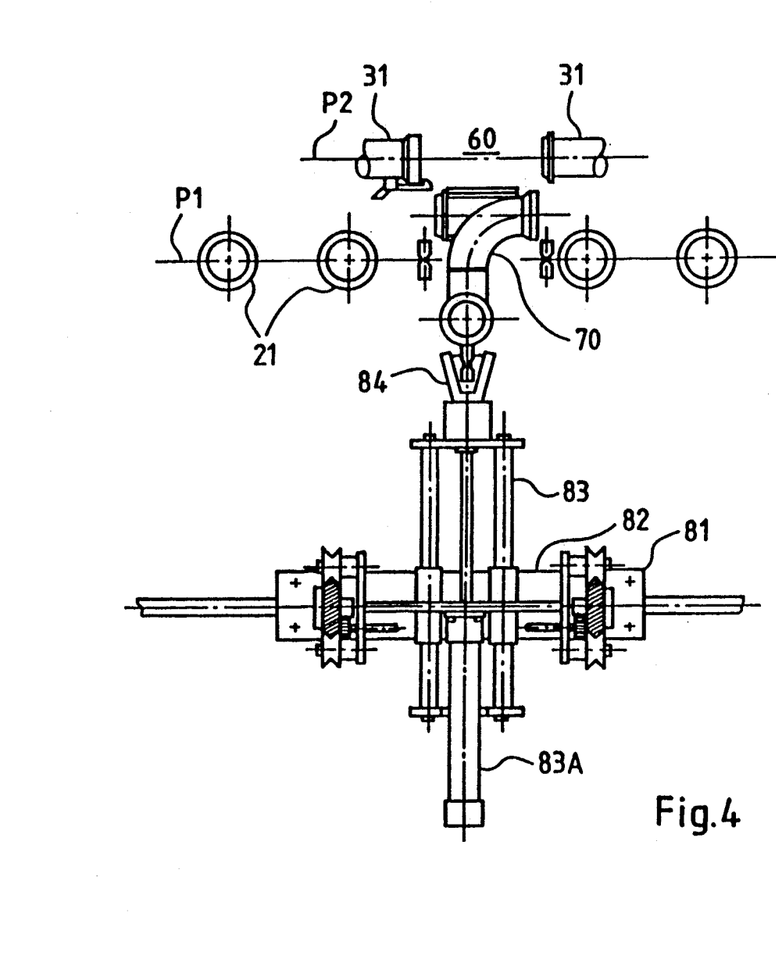
FIG. 4 is a fragmentary view, similar to that of FIG. 2, showing the connecting member being positioned by the manipulator.

A manipulator 80 is provided for manipulating the connecting member 70 in three directions, preferably without changing its orientation. The manipulator 80 comprises a beam 81 parallel to Y—Y and mobile relative to the frame in a direction parallel to X—X, and a carriage 82 that is mobile along the beam 81. The carriage 82 has a telescopic arm 83 parallel to Z—Z and ending at a handling clamp 84 adapted to grasp a handling lug 77 provided on the connecting member 70. The manipulator 80 is supported on a rail 85 fixed to the ground (FIG. 3) and on which the mobile beam 81, provided with rollers 86, is moved horizontally by an electric, hydraulic or pneumatic motor 87 having a toothed wheel meshing with a rack fastened to the rail 85.

Two vertical guide rails support the carriage 82 which is also provided with rollers 88 and a motor 89 for moving it in the vertical plane. A pneumatic, hydraulic or electric actuator 83A on the carriage 82 moves the arm 83, and therefore the handling clamp 84, horizontally, the clamp being pneumatically controlled, for example, to grasp and move the connecting member 70. It will be understood that the manipulator 80 is preferably situated facing the vertical lines.

The couplings 40 of the various lines are disposed facing the manipulator 80 so that to form a gap 60 (FIG. 1) after grasping the connecting member 70 the manipulator 80 merely has to depress the operating lever 46 by means of the connecting member 70 that has a bearing surface 76 for this purpose (for example, a disc adapted to cause a gap 60 to appear in succession in one line of each series). The apparatus illustrated in the drawings comprises four The connecting members 70 have storage locations 90 (see the member 70' in FIG. 2) which at least approximately face in the Z—Z direction toward the fixed end sections 32 of the series with the smaller number of lines, and which reside in the plane P1 of the series with the greater number of lines. These storage locations are, for example, simple bearing bars on which the members 70 rest due to their own weight.

To facilitate positioning the connecting members 70 into the gaps 60 without requiring movement in the X—X or Y—Y direction other than to bring the members from their storage locations, the fixed end sections 22, 32 have retractable end-pieces 22A, 32A facing the interior of the frame and actuators 92. Each end-piece has a travel that is less than the length of a modular section 21, 32, and only slightly greater than the depth of penetration of the male member into the female member. This travel is between 10% and 15% of the length of the modular sections, for example, which modular sections 21, 31 are preferably the same length in both series of lines. The distance between the planes P1 and P2 of the respective series of lines is preferably between three and four times the diameter of the lines.

The translation control actuators 24, 34 have three main configurations:

1) piston rod retracted: this is the disengaged position of connecting member 70;
2) piston rod deployed: this is the line closure position (without the connecting member 70), which position also enables fastening together of all the sections to make a new opening in the string for a new connection point; and
3) actuator in intermediate position, but under pressure: this position allows storage of the connecting member 70 and sealing of the assembly.

Likewise, at the opposite end of the line, the hydraulic actuators 92 enable the string of the sections to be retracted when the line is opened. With the piston rod deployed, the same actuators enable clamping of all end-pieces either with the connecting member 70 inserted or if the line is not in service (closed position).

The control and monitoring devices for the various movements of the manipulator 80 are connected to a control system (FIG. 6) which manages the various functions of the manipulator. The various sensors required for automatic control of the system are not described, but only the major components are shown in the FIG. 6 block diagram of the control system since the details of this control system will be familiar to a person skilled in the art in light of the following information. The control system comprises a programmable automatic controller 100 for the manipulator 80 and the connecting member 70 locking actuators, a hydraulic power source 101, a three-position solenoid valve 102 to control each connecting member locking actuator, actuator position sensors 103, and a screen/keyboard 104 enabling the operator to monitor the status of the connections. This system also could be integrated into an overall control system of the production unit.

A typical connection sequence is as follows, starting with the connecting member 70 of the chosen line 30 in its storage location 90 at the end of, but not inserted in, a horizontal line. It should be remembered that a storage position is preferably provided for each horizontal line. The operator indicates on the keyboard the chosen horizontal and vertical lines; when the choice has been confirmed and the instruction given, the manipulator 80 takes the connecting member 70 through the following steps:

a) displacement of the connecting member 70 in the X—X and Y—Y directions to face the required location;
b) horizontal advance (direction Z—Z) of the connecting member 70 until the coupling 40 holding the vertical sections together is unlocked;
c) withdrawal of the vertical section by the actuators 24 and 92 and consequent opening of a gap 60 in the vertical line;
d) further horizontal advance until the coupling 40 holding the horizontal sections together is unlocked;
e) withdrawal of the horizontal section by the actuators 34, 92 and consequent opening of a gap 60 in the horizontal line;
f) horizontal advance of the connecting member 70 into alignment and abutting engagement with the adjacent horizontal and vertical sectional (connection position); and
g) clamping the connecting member 70 to said adjacent sections in two stages;
   1) actuation of the actuators 92 in both vertical and horizontal lines to the end of their travel, and
   2) actuation of the opposite actuators 24 and 34 to establish a sealed connection between the connecting member 70 and both vertical horizontal lines.

The disconnection operation is carried out in steps opposite to the connection sequence described above.

The actuators are maintained in pressurized condition by a hydraulic accumulator and by controlled valves preventing any unintentional opening of the pipelines in service (under pressure) in the event of rupture of the hydraulic lines feeding the solenoid valves.

The main dimensions of the illustrated preferred embodiment are as follows:

inside diameter of lines: approximately 10 centimeters (4 inches);
frame length: approximately 3.20 meters;
gantry height: approximately 2.60 meters;
distance between lines and section length: approximately 35 centimeters; and
distance between planes P1 and P2: approximately 30 centimeters.

The foregoing description has been given by way of non-limiting example only, and numerous variants may occur to a person skilled in the art without departing from the spirit and scope of the invention. For example, the actuators described above are hydraulic but could instead be screw, electric, or pneumatic actuators. Also, the apparatus shown includes a manipulator but such is not essential, especially with small numbers of inlet/outlet lines (as here) and/or small line diameters such as 25 mm, 51 mm or 76 mm, (1, 2 or 3 inches) or even 100 to 150 mm (4 to 6 inches), in which case the weight of the connecting member 70 enables manual handling and unlocking the horizontal and vertical lines at the appropriate point. To facilitate proper placing of the connecting members 70, guides are provided on the connecting members and transversely on the guide rails of the pipeline sections, in the direction Z—Z.

Although the best mode contemplated for carrying out the present invention has been herein shown and described, it will be apparent that modification and variation may be made without departing from what is regarded to be the subject matter of the invention.

What is claimed is:

1. A temporary selective pipe connection apparatus with multiple fluid inlets and outlets comprising:
   a generally parallelogram-shape frame comprising first and third sides parallel to a first direction, and second and fourth sides parallel to a second direction;
   a first series of n coplanar equidistantly spaced parallel tubular lines extending between said first and said third sides parallel to said second direction; and
   a second series of m coplanar equidistantly spaced parallel tubular lines extending between said second and said fourth sides parallel to said first direction;
   said first and second series of tubular lines having the same inside diameter and being situated in parallel planes offset by a distance L along a third direction perpendicular to both of said first and said second directions;
   each tubular line comprising
   a string of identical modular sections of which there are at least m−1 modular sections for each line of said first series and at least n−1 modular sections for each line of said second series;
   each string being connected at one end to a fixed tubular end section adapted to be connected to a fluid inlet or outlet; and
   each string being connected at the other end to a blind end section fixed to a translation control unit;
   the fixed end tubular sections of said first and second series being respectively fixed to first and second sides of said frame; and
   the translation control units of said first and second series being respectively fixed to said third and fourth sides of said frame; coupling means for coupling each modular section of a string together and for coupling said strings to said fixed tubular end sections and said blind end sections;
   said coupling means having a release position whereby the couplings between the modular section, or the couplings between said strings and said fixed tubular end sections or said blind end sections may be temporarily eliminated;
   each modular section of one of said series having a length equal to the distance between the lines of the other of said series;
   sealing members provided at each interface between modular sections and said fixed and blind end sections;
   said modular sections and said blind end section of each line being individually slidably mounted on guide rails parallel to said line, whereby when the coupling between any two sections of a line is temporarily eliminated, movement of the blind end section of said line by its translation control unit away from the fixed end tubular section of said line produces a gap in the line between any of said modular sections or between a modular section and said blind end section;
   at least one free connecting member adapted to simultaneously occupy a gap produced in each of said first and said second series;
   said free connecting member comprises
   a central section adapted to be aligned approximately parallel to said third direction, and two transverse sections respectively attached at opposite ends of said central section and separated by a distance equal to the distance between said first series and said second series of tubular lines, each of said transverse sections adapted to be aligned with one of said first and second directions respectively;
   said transverse sections being temporarily fastened to said lines by movement of said blind end sections of said lines toward the fixed end sections of said lines.

2. An apparatus according to claim 1, further comprising:
   a manipulator having a handling clamp adapted to control movement of said connecting member and to displace said connecting member without changing its orientation;
   said manipulator being moveable in said first, second, and third directions.

3. An apparatus according to claim 2, wherein said manipulator further comprises:
   a beam parallel to the lines of one of said series; said beam being moveable relative to the frame in a direction parallel to the lines of the other of said series;
   a carriage moveable along said beam and carrying a telescopic arm; said arm being aligned parallel to said third direction; said arm supporting said handling clamp.

4. An apparatus according to claim 3, wherein the number of said lines in said first series differs from the number of lines in said second series.

5. An apparatus according to claim 1, wherein each of said coupling means further comprises:
   a pivoting hook carried by one modular section and adapted to fit in an engaged position over a rim provided on an adjacent modular section;
   a spring-biased operating lever for displacing said hook between said engaged position and a release position.

6. An apparatus according to claim 5, wherein said connection member comprises a bearing surface adapted to contact said operating lever for actuating said coupling means.

7. An apparatus according to claim 6, further comprising:
   a plurality of connecting members, wherein the total number of connecting members is equal to the smaller of the number of lines in said first series and the number of lines in said second series.

8. An apparatus according to claim 7, further comprising:
   storage locations in said frame for storing and connecting members.

9. An apparatus according to claim 8, wherein:
   each of said fixed end sections has an end-piece for engaging one one of said connecting members;
   each of said end-pieces is retractable over a travel less than the length of one of said modular sections; and
   each of said end pieces is adapted to retract to a retracted position to provide clearance for placement of said connecting member to be engaged, whereby said end-piece is released from said retracted position to engage said connecting member.

10. An apparatus according to claim 9 characterized in that said travel is between 10% and 15% of the length of one of said modular sections.

11. An apparatus according to claim 10 characterized in that each modular section comprises a male end-piece and a female end-piece, both provided with seals.

12. An apparatus according to claim 11 characterized in that said distance L is at least three times the inside diameter of said lines.

13. An apparatus according to claim 12 characterized in that said first, second, and third directions are mutually perpendicular.

14. An apparatus according to claim 13 characterized in that said series of lines are in vertical planes.

15. An apparatus according to claim 14 characterized in that each of said translation control units is piston-cylinder actuator.

16. An apparatus according to claim 15 characterized in that the integer numbers n and m are between 5 and 30.

17. An apparatus according to claim 1 wherein the first, second and third directions are mutually perpendicular.

18. An apparatus according to claim 1 wherein the two series of pipelines reside in parallel vertical planes.

* * * * *